United States Patent
Wang et al.

(10) Patent No.: US 8,909,762 B2
(45) Date of Patent: Dec. 9, 2014

(54) NETWORK SYSTEM MANAGEMENT

(75) Inventors: Chengwei Wang, Atlanta, GA (US);
Vanish Talwar, Campbell, CA (US);
Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 516 days.

(21) Appl. No.: 13/050,359

(22) Filed: Mar. 17, 2011

(65) Prior Publication Data

US 2012/0239799 A1 Sep. 20, 2012

(51) Int. Cl.
*G06F 15/173* (2006.01)
*H04L 12/24* (2006.01)
*H04L 12/26* (2006.01)

(52) U.S. Cl.
CPC .............. *H04L 41/145* (2013.01); *H04L 43/16* (2013.01); *H04L 41/12* (2013.01); *H04L 41/147* (2013.01)
USPC ........................................................ 709/224

(58) Field of Classification Search
CPC ....... H04L 41/12; H04L 41/147; H04L 43/16; H04W 16/00; H04W 24/00; H04W 84/00
USPC ................................................. 709/223–225
See application file for complete search history.

(56) References Cited

U.S. PATENT DOCUMENTS

| | | | | |
|---|---|---|---|---|
| 4,688,207 A * | 8/1987 | Yoshimoto | ..................... | 370/310 |
| 5,414,812 A * | 5/1995 | Filip et al. | ..................... | 707/694 |
| 5,710,885 A * | 1/1998 | Bondi | ........................... | 709/224 |
| 5,793,976 A * | 8/1998 | Chen et al. | .................... | 709/224 |
| 5,812,532 A * | 9/1998 | Oki et al. | ....................... | 370/255 |
| 5,961,596 A * | 10/1999 | Takubo et al. | ................ | 709/224 |
| 6,058,102 A * | 5/2000 | Drysdale et al. | ............... | 370/252 |
| 6,347,336 B1* | 2/2002 | Song et al. | .................... | 709/223 |
| 6,392,313 B1* | 5/2002 | Epstein et al. | .................. | 290/52 |
| 6,505,254 B1* | 1/2003 | Johnson et al. | ............... | 709/239 |
| 7,039,015 B1* | 5/2006 | Vallone et al. | ................ | 370/252 |
| 7,120,680 B1* | 10/2006 | Higgins et al. | ................ | 709/220 |
| 7,378,960 B1* | 5/2008 | Binding et al. | .......... | 340/539.13 |
| 7,490,323 B2 | 2/2009 | D'Alo et al. | | |
| 7,624,167 B1* | 11/2009 | Benjamin | ..................... | 709/223 |
| 7,782,786 B1* | 8/2010 | Natarajan et al. | ............. | 370/244 |
| 7,801,030 B1* | 9/2010 | Aggarwal et al. | ............. | 370/228 |
| 8,175,862 B1* | 5/2012 | Bourlatchkov et al. | ......... | 703/14 |
| 2001/0004352 A1* | 6/2001 | Watanabe et al. | ............. | 370/252 |
| 2003/0046390 A1* | 3/2003 | Ball et al. | ....................... | 709/224 |
| 2004/0143428 A1* | 7/2004 | Rappaport et al. | .............. | 703/22 |

(Continued)

OTHER PUBLICATIONS

Canas, et al., "Jde+: an Open-Source Schema-Based Framework for Robotic Applications", Robotics Group, Universidad Rey Juan Carlos, 2007, 6 pages.

(Continued)

*Primary Examiner* — Brian J Gillis
*Assistant Examiner* — Shean Tokuta

(57) ABSTRACT

Systems, methods, and machine-readable and executable instructions are provided for network system management. Network system management can include receiving a network system size and a number of system parameters. Network system management can also include receiving a desired monitoring performance and a desired monitoring quality. Furthermore, network system management can include generating a monitoring system topology for a monitoring and analysis system based on the network system size, the number of system parameters, the desired monitoring performance, and the desired monitoring quality.

14 Claims, 6 Drawing Sheets

(56) References Cited

U.S. PATENT DOCUMENTS

| | | | |
|---|---|---|---|
| 2004/0203431 A1* | 10/2004 | Cooper | 455/67.11 |
| 2005/0102426 A1* | 5/2005 | Hamm et al. | 709/243 |
| 2005/0138578 A1* | 6/2005 | Alpert et al. | 716/2 |
| 2006/0019679 A1* | 1/2006 | Rappaport et al. | 455/456.5 |
| 2006/0153496 A1* | 7/2006 | Tanobe et al. | 385/24 |
| 2006/0239201 A1* | 10/2006 | Metzger et al. | 370/252 |
| 2007/0006177 A1* | 1/2007 | Aiber et al. | 717/136 |
| 2007/0286071 A1 | 12/2007 | Cormode et al. | |
| 2008/0132257 A1* | 6/2008 | Fok et al. | 455/466 |
| 2009/0121929 A1* | 5/2009 | Binding et al. | 342/357.07 |
| 2009/0190494 A1* | 7/2009 | De Giovanni et al. | 370/254 |
| 2009/0285093 A1* | 11/2009 | Bolt et al. | 370/231 |
| 2009/0310578 A1* | 12/2009 | Convertino et al. | 370/338 |
| 2009/0312990 A1* | 12/2009 | Fouce et al. | 703/2 |
| 2009/0327458 A1 | 12/2009 | Xuezheng et al. | |
| 2010/0017247 A1* | 1/2010 | Liu et al. | 705/8 |
| 2010/0150171 A1* | 6/2010 | Rodbro et al. | 370/468 |
| 2010/0286824 A1* | 11/2010 | Solomon | 700/248 |
| 2010/0322621 A1* | 12/2010 | Jenkins et al. | 398/26 |
| 2011/0161952 A1* | 6/2011 | Poddar et al. | 717/173 |
| 2011/0173342 A1* | 7/2011 | Cooper et al. | 709/233 |
| 2012/0137278 A1* | 5/2012 | Draper et al. | 717/170 |

OTHER PUBLICATIONS

Prieto, et al., "Adaptive Real-time Monitoring for Large-scale Networked Systems," Jun. 1, 2009, 6 pages.

Wang, et al., "A Flexible Architecture Integrating Monitoring and Analytics for Managing Large-Scale Data Centers", Center for Experimental Research in Computer Systems, College of Computing, Georgia Institute of Technology, ICAC-11, Published: Jun. 14-18, 2011, Karlsruhe, Germany, 10 pages.

Talwar, et al, "Managing a Network System", U.S. Appl. No. 12/795,191, filed Jun. 7, 2010, 33 pages.

* cited by examiner

NETWORK SYSTEM MANAGEMENT

BACKGROUND

Managing large-scale data centers and utility clouds may include continuous monitoring and analysis of the data captured by the monitoring. Monitoring and data analysis are important components of a closed-loop automation solution in these large-scale data centers. Monitoring tracks desired hardware and software metrics, and data analysis evaluates these metrics to identify system or application states for troubleshooting, resource provisioning, and/or other management actions.

DETAILED DESCRIPTION

Figure 1:
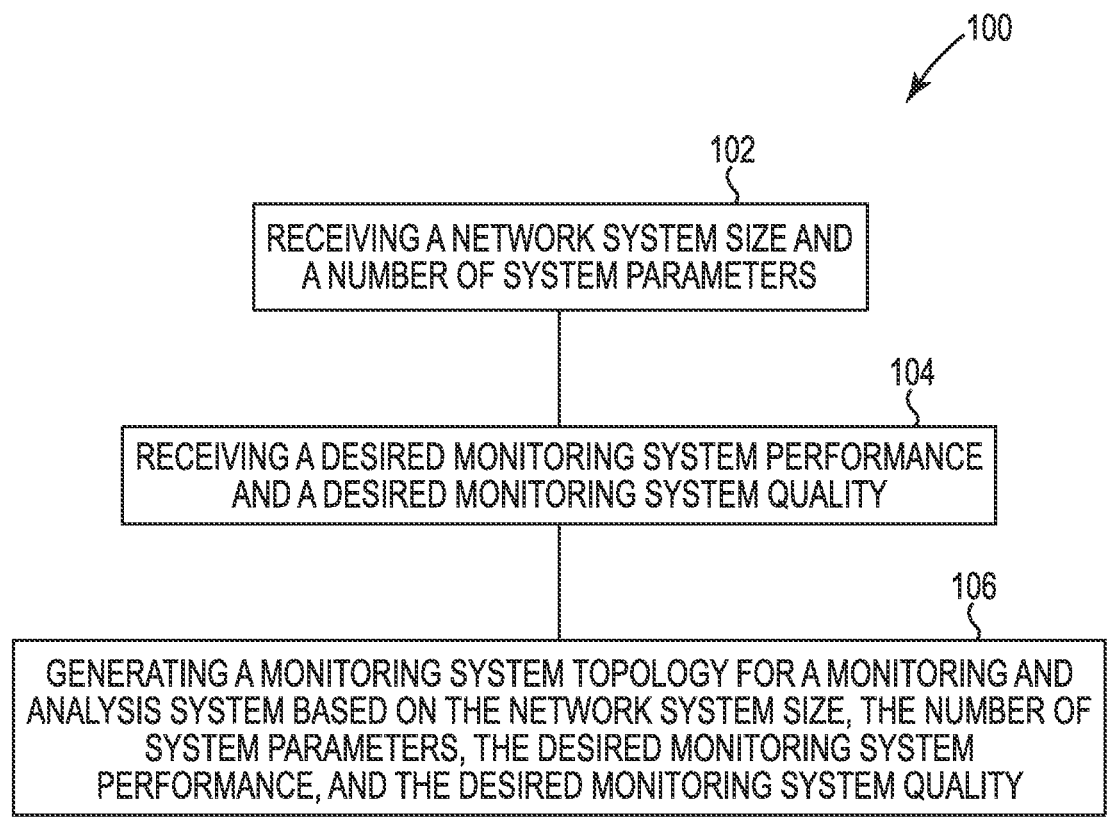
FIG. 1 is a flow chart illustrating an example of a method for network system management according to the present disclosure.

Examples of the present disclosure may include methods, systems, and machine-readable and executable instructions and/or logic. An example method for network system management may include receiving a network system size and a number of system parameters. An example method for network system management may also include receiving a desired monitoring system performance and a desired monitoring system quality. Furthermore, an example method for network system management may include generating a monitoring system topology for a monitoring and analysis system based on the network system size, the number of network system parameters, the desired monitoring system performance, and the desired monitoring system quality.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 546 may reference element "46" in FIG. 5, and a similar element may be referenced as 646 in FIG. 6. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

A distributing monitoring and analysis infrastructure, (e.g., Monalytics), can function as a scalable architecture combining monitoring and analysis in data centers. An example of a Monalytics topography can be seen in FIG. 3. A data center may be a facility used to house computer systems and associated components (e.g., telecommunications and storage systems). A data center can include redundant or backup power supplies, redundant data communications connections, environmental controls, and security devices. A data center can run applications that handle core business and operational data of an organization. The data center can include servers or nodes in multiple locations throughout the data center.

Monalytics can combine monitoring functions of data capture and dissemination with scalable analysis of captured data. Monalytics can perform monitoring and analysis functions through a distributed computation graph distributed across nodes of a data center. A node may be a client or an access point (AP) in a network or monitoring and analysis system. A node may also be a device, such as a switch or a server in a network or monitoring and analysis system. The graph can represent a computational process, and it can encompass capabilities of a hybrid design of a network system so that multiple design choices (e.g., centralized, hierarchical, peer-to-peer) can be supported. An appropriate topology for the graph for the purpose of distributed monitoring and analysis can result in meeting goals of the system. For example, the network system can include a data center, and the graph can be run as an online service in a large-scale network system such as a large-scale data center or a utility cloud. A network system can also include a monitoring and analysis system.

The use of Monalytics can include determining metrics (e.g., performance metrics) for a plurality of nodes in a network system. Logical collections of nodes (e.g., zones) can be determined based on the metrics for the network system, and architectures can be determined and implemented for each node collection. Some of the node collections may implement different architectures (e.g., centralized, hierarchical, peer-to-peer) depending on the needs of the collection. Monalytics can also include a second determination of metrics after implementation of the architectures. A number of the architectures may also be modified as a result of the second determination.

FIG. 1 is a flow chart 100 illustrating an example of a method for network system management according to the present disclosure. At 102, a network system size (e.g., the number of nodes (N) in the network system infrastructure) and a number of system parameters (e.g., network system parameters) are received. The number of system parameters can be the values of considered network system parameters, but may not be the quantity of parameters. The network system infrastructure can include a combined set of hardware, software, networks, and facilities, used to develop, test, deliver, monitor, control or support information technology services. A node may be a client or an access point in a network or monitoring and analysis system, or it may be a device, such as a switch or a server in a network. The network system size and the number of system parameters can be received at a monitoring system topology constructor. The system parameters can include a number of sensors per node (n), system latency (l) (e.g., time delay experienced in the system), available end-to-end network system bandwidth (W), data size per node (s), per-node failure probability per second (f), per-metric comparison time (a), bandwidth budget in the form of a percentage ($B_b$), and the number of nodes in a zone ($N_r$). The data size per node (s) can be the total disk space, memory space or other storage device space occupied by monitoring metrics data collected on each node. The per-node failure probability (f) can include the probability of a node failure in every time period of one second. The per-metric comparison time (a) can be the time it takes to compare a first monitoring data value to a second data value. The second data value can be a threshold value or a monitoring data value. The bandwidth budget ($B_b$) can include the percent of available end-to-end network system bandwidth that may be used for monitoring and analysis purposes.

A node sensor can be a node in a network or monitoring and analysis system that is capable of performing some processing, gathering sensory information and communicating with other connected nodes in the network or monitoring and analysis system. The system latency (l) can be a measure of time delay experienced in a network system, and the end-to-end network system bandwidth (W) can be the available network data communication resources.

A zone can be a logical collection of machines. For example, a zone can include a physical subsystem, (e.g., a set of racks on a single network switch in a data center). A zone can be a physically co-located set of racks in a hardware-centric view, and a zone can be a collection of machines spanning multiple racks running a service in a service-centric view. A zone can be determined based on a set of servers in a cloud running a customer's application, and applications (e.g., web applications) running on virtual machines can span multiple zones. A zone can also delineate data center subsystems or multiple physical data centers in a single cloud.

The monitoring system topology constructor can automate the process of deciding a topology for a distributing monitoring and analysis infrastructure (e.g., Monalytics) computation graph to meet certain goals for the system. The goals can be determined by considering the performance delivered by an actual Monalytics infrastructure (P), an actual quality of the analytics decisions (Q), and an actual cost (C) in delivering the Monalytics infrastructure.

At 104, a desired monitoring system performance and desired monitoring quality are received. The desired monitoring system performance (P') and desired monitoring system quality (Q') can be received at a monitoring system topology constructor. The desired monitoring system performance can be the time to insight, or it can be the number of continuous analytics operations that can be delivered per second in a Monalytics computation graph. The time to insight can be used to assess performance of monitoring and analysis actions, and the time to insight can capture a total delay between when an event occurs and the time the event is recognized (e.g., after analysis is complete). The desired monitoring system analysis rate can be an indication of how fast the monitoring and analysis system can react to states of a monitored system (e.g., misbehavior).

The desired monitoring system quality can be an expected ratio of available data used for analysis operations in the presence of failures, mismatch of sampling rates during aggregation (e.g., the number of samples per second taken from a continuous signal to make a discrete signal do not match), or other issues in the distributed system. An accuracy delivered by an analytics algorithm (e.g., false alarm rate) may also be considered in monitoring system quality. A false alarm rate can be a probability of false detection, or a fraction of false alarms given an event did not occur. An administrator may have a desired false alarm rate for input into a topology constructor.

A desired cost (C') can also be received by a monitoring system topology constructor. An actual cost (C) can be the amount of dedicated resources used for the Monalytics infrastructure, and an example desired cost (C') can be chosen by a system administrator based on the needs of the system. The cost (e.g., desired or actual) can be measured in terms of server resources (e.g., capturing central processing unit and memory), as well as dedicated bandwidth usage. The desired performance (P'), the desired quality (Q'), and the desired cost (C') can be functions of the number of nodes (N) in the system, which can be greater than the number of nodes in a zone ($N_r$). The values of each can be entered by a system administrator.

The performance, quality, and cost may vary depending on individual inputs. Increased values for desired performance (P') and desired quality (Q') can result in an increased actual cost (C) in the system. An increased desired quality (Q') may result in decreased actual performance (P). These trade-offs can be made based on the needs of the system. For example, if the system does not have increased performance needs (e.g., throughput of continuous analytics operations), a topology can be constructed that uses decreased dedicated resources and decreased actual cost (C) to deliver the desired performance (P'). In another example, an increased tolerance to quality Q can result in a system with a decreased actual cost (C).

Different topologies of the computation graph can give different results for actual performance (P), actual quality (Q), and actual cost (C) for a given scale. The topology constructor can dynamically determine a topology specific to the needs of the system, rather than impose a static, rigid topology for the analytics operation. The topology constructor can be invoked at the beginning of the data center operation, and it can also be invoked at any time during the data center operation (e.g., runtime) to make impromptu reconfigurations to the Monalytics topology. By doing so, the topology constructor can automate the process of choosing a topology in the distributed monitoring and analysis system (e.g., Monalytics) based on desired performance (P'), desired quality (Q'), desired cost (C'), and the scale of the system. The automated process of constructing a monitoring system topology for monitoring and analysis infrastructures can be performed in large-scale data centers to increase efficiency and cost benefits, and the use of a topology constructor can provide a framework for implementing reconfigurability of topologies for analysis operations in data centers.

At 106 a system topology for a monitoring and analysis system based on the network system size, the number of system parameters, the desired monitoring system performance, and the desired monitoring system quality is generated. In generating this topology, a topology constructor can use the specific system parameters and system size received to evaluate analytical models for various system topologies. The topology constructor can determine actual performance (P), actual quality (Q), and actual cost (C) values for each of the analytical models. The topology constructor can also choose which analytical model or models it would like to implement based on the actual performance (P), actual quality (Q), and actual cost (C) determinations, as well as the desired performance (P'), desired quality (Q'), and desired cost (C'). The topology constructor can create hybrid topologies for the monitoring and analysis system, and the topology that has been generated can be placed into the data center for use.

Figure 2:
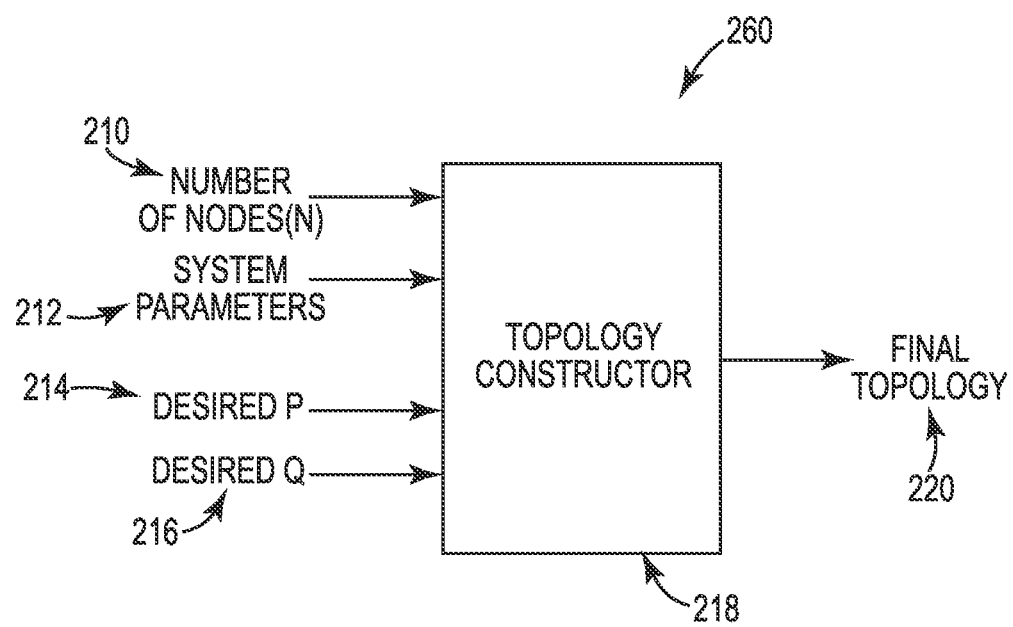
FIG. 2 illustrates a diagram of an example of a system for network system management according to the present disclosure.

FIG. 2 illustrates a diagram of an example of a system 260 for network system management according to the present disclosure. The system 260 can include a topology constructor 218 used to generate a monitoring system topology. The number of nodes (N) 210 in the infrastructure is received by the topology constructor 218. The topology constructor 218 also receives a number of system parameters 212. The topology constructor 218 can receive desired performance (P') 214 and desired quality (Q') 216, respectively. The topology constructor 218 generates the appropriate monitoring system topology, and the topology constructor 218 outputs the final topology 220 for the system.

The system can use the desired performance (P') and the desired quality (Q') to determine a topology that has a decreased cost to reach a threshold (P*Q)/C for the given scale (N). An example threshold may result in a maximized (P*Q)/C for the given scale (N). The performance, quality, and cost used to determine (P*Q)/C can be a desired performance (P'), a desired quality (Q'), and/or a desired cost (C'). Different combinations can be used to determine different outcomes. The system can also use desired performance (P') and desired quality (Q') to determine a topology that has decreased sensitivity to changes in (N) to maintain (P*Q)/C optimization criterion (e.g., if the number of nodes in the system infrastructure (N) changes, decrease any disruption to changes made in topology to maintain an administrator's requirement for (P') and (Q') at decreased cost). For example, the system can determine a topology that is least sensitive to changes in the number of nodes in the network system infrastructure (N) to maintain the optimization criterion. A topology that is least sensitive to changes in the number of nodes (N) may sustain a decreased impact to the (P*Q)/C threshold criterion when the number of nodes (N) changes over a more sensitive topology.

Figure 3:
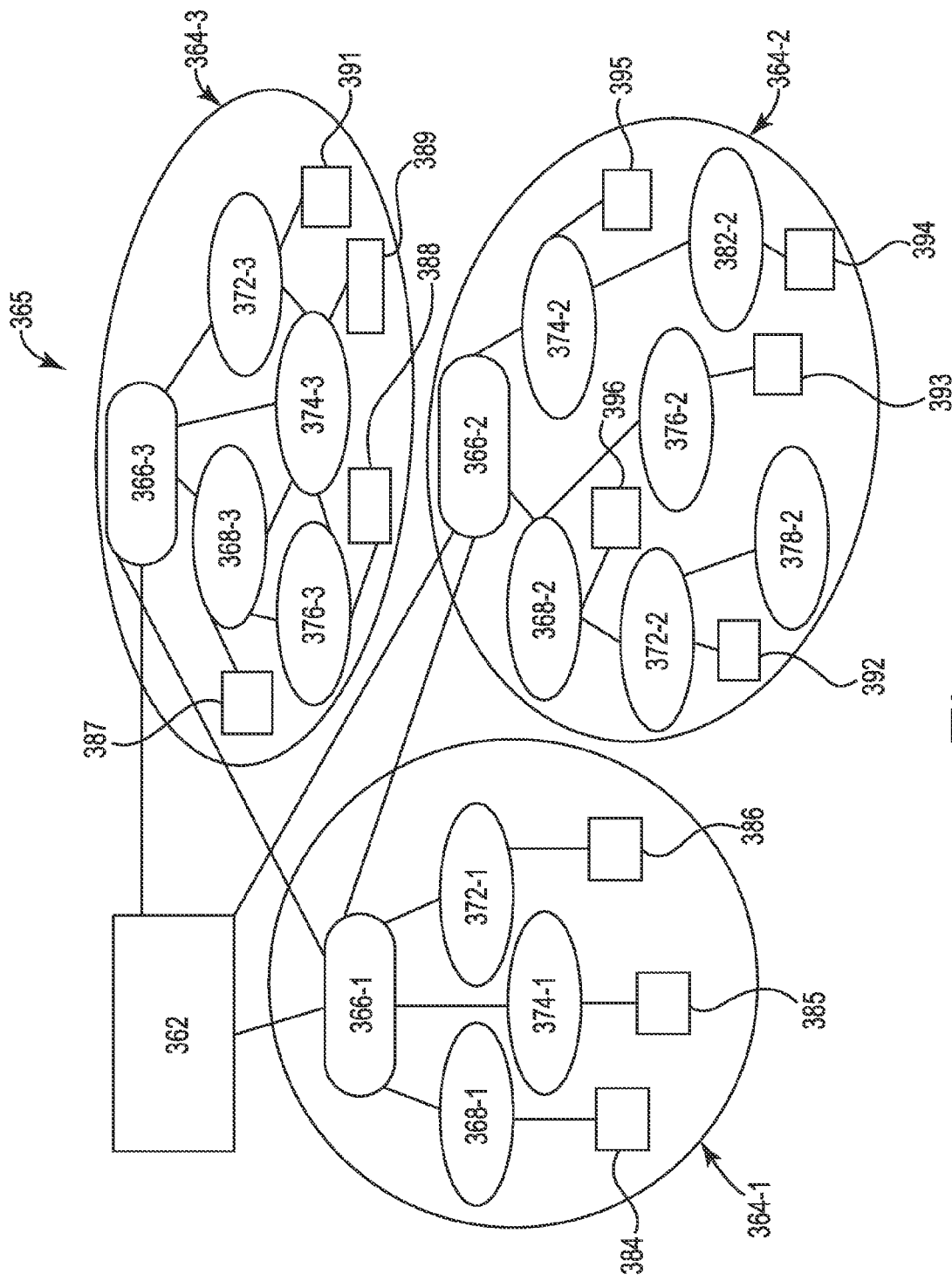
FIG. 3 illustrates a diagram of an example of a monitoring system topology for network system management according to the present disclosure.

FIG. 3 illustrates a diagram of an example of a monitoring system topology 365 for network system management according to the present disclosure. The monitoring and analysis system (e.g., Monalytics) topology 365 includes a central management station (CMS) 362 and zones 364-1, 364-2, and 364-3. The CMS 362 can manage the plurality of zones.

Each of the zones 364-1, 364-2, and 364-3 includes a zone leader. For example, the zone 364-1 includes a zone leader 366-1, the zone 364-2 includes a zone leader 366-2, and the zone 364-3 includes a zone leader 366-3. Zone 364-1 is an example of a centralized topology, zone 364-2 is an example of a hierarchical topology, and zone 364-3 is an example of a peer-to-peer topology. These topographies will be discussed further with respect to FIG. 4.

The CMS 362 can communicate with the zone leaders 366-1, 366-2, and 366-3. Each of the zones 364-1, 364-2, and 364-3 includes a plurality of monitoring brokers. For example, the zone 364-1 includes monitoring brokers 368-1, 372-1, and 374-1, the zone 364-2 includes monitoring brokers 368-2, 372-2, 374-2, 376-2, 378-2, and 382-2 and the zone 364-3 includes monitoring brokers 368-3, 372-3, 374-3, and 376-3.

The monitoring brokers can communicate with at least one data collector. For example, each of the monitoring brokers 368-1, 372-1, and 374-1 is linked to each of data collectors 384, 385, and 386. Each of the monitoring brokers 368-2, 372-2, 374-2, 376-2, 378-2, and 382-2 is linked to each of data collectors 392, 393, 394, 395 and 396, and each of the monitoring brokers 368-3, 372-3, 374-3, and 376-3 is linked to each of data collectors 387, 388, 389, and 391. The monitoring brokers can aggregate data including metrics received from each of the data collectors. The metrics can be performance metrics, and they can be analyzed to detect anomalous behavior in the system. Example metrics include, among others, a current state of the network system including a current load of the network system, latency, throughput, bandwidth, system utilization (e.g., CPU, memory), power consumption, and temperature readings.

The monitoring brokers 368-1, 372-1, 374-1, 368-2, 372-2, 374-2, 376-2, 378-2, 382-2, 368-3, 372-3, 374-3, and 376-3 can be nodes in the network system. The data collectors 384-389 and 391-396 can also be nodes in the network system. Similarly, zone leaders 366-1, 366-2, and 366-3 can be nodes in the network system, and the monitoring brokers can communicate with other nodes in a zone via an identifier associated with each of the nodes in the network system.

Figure 4:
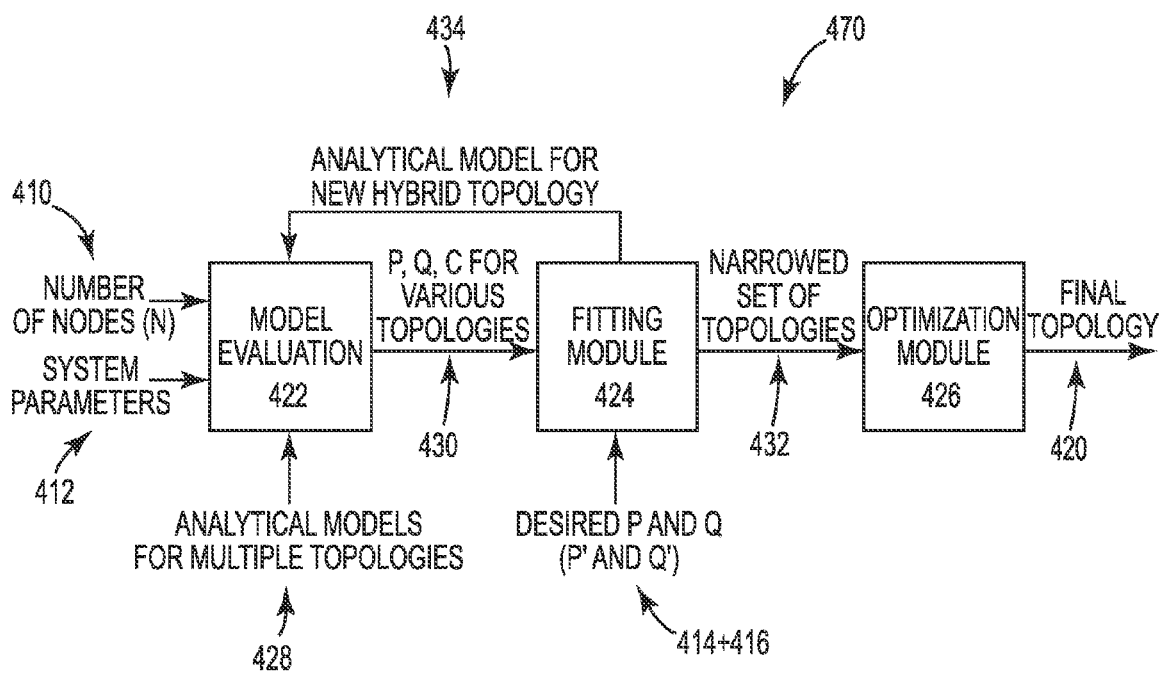
FIG. 4 illustrates a diagram of an example of a method for network system management according to the present disclosure.

FIG. 4 illustrates a diagram of an example of a method 470 for network system management according to the present disclosure. The method 470 can include the execution flow of a topology constructor (e.g., topology constructor 218 illustrated in FIG. 2), and can result in a determination of a final topology of a monitoring and analysis system. The execution flow of the topology constructor may be entirely automated, or it may involve administrator participation (e.g., choosing a fit for an administrator's system).

In order to determine a final system topology, it can be assumed in an example method that the topology constructor has a suite of analytical models 428 for different topologies that can plot (P*Q)/C for different (N) with the provided system parameters. The different topologies can include centralized, hierarchical, and/or decentralized (e.g., binomial swap forest, peer-to-peer) topologies, among others. The different topologies can also include hybrid topologies combining one or more of centralized, hierarchical, and decentralized configurations within a zone or across zones. The hybrid topologies may be included in the suite of analytical models 428, or the hybrid topologies can be created impromptu by the topology constructor. A hybrid topology can be useful when certain topologies work for specific data center zones, but not others. The topologies can remain connected, but the hybrid nature allows for increased efficiency and performance.

Numerous parameters can be considered in determining topologies. One such consideration is time to insight. Time to insight can be defined as the latency between when one monitoring sample is collected on each node, and when the analysis on all of those monitoring samples is completed. Other parameters to consider in determining topologies can include the number of nodes in the network system infrastructure (N), a network latency (l), a bisection bandwidth (B), a bandwidth budget (b), a size of monitoring data per node (s), a number of metrics (n), a processing time per metric (a), a capital cost per server (C), a fraction of management cost per server (a), and a number of nodes per zone ($N_r$). A bisection bandwidth (B) can be a bandwidth between segments of a network system, and a bandwidth budget (b) can be a bandwidth allocated to the monitoring and analysis system. The metrics can be performance metrics including the current load of the network system, throughput, system utilization (e.g., memory), power consumption, and temperature readings. The number of metric (n) can include the amount of monitoring metrics data on each node. The processing time per metric (a) can include the time it takes to process a single metric, and the capital cost per server (C) can include the dollar amount incurred to purchase a server. The management cost per server (α) can include a percent of capital cost, and it can be used solely for management purposes.

In a centralized topology, monitoring data collected from each node is sent to a centralized server (e.g., a centralized server provides a function or service to one or many nodes, which initiate requests for such services) for analysis. For example, the centralized topology time to insight ($T_C$) can be $$T_C(N) = \frac{s}{B*b} + l + F(n, N),$$

if B>B*b*N;
however, if a bisection bandwidth (B) is less than or equal to the product of the bisection bandwidth (B), a bandwidth budget (b), and the number of nodes in the network system infrastructure (N), then, $$T_C(N) = \frac{s*N}{B} + l = F(n, N).$$

In an example of a hierarchical tree topology, a parent node can analyze its child node's data and send the results to a next parent at a higher level. A child node is a node, that can only directly communicate with its parent node (and with no other node), and a parent node can only directly communicate with its children nodes and with its own parent node. A hierarchical tree topology time to insight ($T_{HT}$), where cell represents mapping a real number to the smallest following integer (e.g., ceil(x)=the smallest integer not less than x) can be $$T_{HT}(N) = \\
(\text{ceil}(\log_d N) - 1) * \left( \frac{d*s}{B} + l + F(n, d) + \frac{\text{ceil}\left(\frac{N}{d^{\text{ceil}(\log_d N)-1}}\right)*s}{B} + l + \\
F\left(n, \text{ceil}\left(\frac{N}{d^{\text{ceil}(\log_d N)-1}}\right)\right)\right).$$

If the hierarchical tree topology is positioned (e.g., collocated mode) with a monitored system, the bandwidth resource for each node for aggregation may be limited. In collocated mode, each node in a monitored system is running both the application codes and the management code from Monalytics. As a result, the resource of the node is not dedicated for management purposes. This may differ from a dedicated mode, in which the resource of a server may only be used for management purposes. In a collocated mode situation, the hierarchical tree topology time to insight ($T'_{HT}$) can be $$T'_{HT}(N) = \\
(\text{ceil}(\log_d N) - 1) * \left( \frac{d*s}{B*b} + l + F(n, d) + \frac{\text{ceil}\left(\frac{N}{d^{\text{ceil}(\log_d N)-1}}\right)*s}{B*b} + l + \\
F\left(n, \text{ceil}\left(\frac{N}{d^{\text{ceil}(\log_d N)-1}}\right)\right)\right).$$

In a binomial swap forest topology, each node can compute an intermediate result by repeatedly swapping data with other nodes. A binomial swap forest topology is an example of a decentralized topology. In an example, a binomial swap forest topology runs in collocated mode and its time to insight ($T_{BSF}$) can be:

$$T_{BSF} = \text{ceil}(\log_2 N) * \left(\frac{s}{B*b} + l + F(n, 2)\right).$$

Another example of a decentralized topology is a peer-to-peer topology. A peer-to-peer topology can include a distributed application infrastructure that partitions tasks or workloads between peers. Peers can be equally privileged participants, and they form a peer-to-peer network or network system of nodes.

In hybrid monitoring system topologies (e.g., distributed computation graphs), topologies such as centralized, hierarchical tree, and binomial swap forest topology can be used locally within regions (e.g., zones) and also to interconnect zone leaders. A zone leader may be the communication point of a zone. The resulting graph is a hybrid of multiple topologies, same or different, interconnected together. An administrator may also choose to have a topology constructor generate models for individual zones and later combine the individual models to create a hybrid topology. An administrator may also desire the management of particular network system nodes, and in turn, can choose particular nodes to manage. The method 470 can include a topology constructor generating a monitoring system topology based on the desired network nodes.

For a hybrid distributed computation graph that consists of m zones which process their local monitoring data in parallel, the time for leaders to receive the aggregated data would be $\max_{i=1}^{m} T_{INTRA}(R_i)$, where $T_{INTRA}(R_i)$ is the time to insight for zone i, and $R_i$ is the number of nodes in zone i. The zone leaders can cooperate to perform the next level processing in a time of $T_{INTER}(m)$. The time to insight and capital cost of a hybrid distributed computation graph can be formulated as follows:

$$T_{HYBRID}(N) = \max_{i=1}^{m} T_{INTRA}(R_i) + T_{INTER}(m) \text{ and}$$

$$C_{HYBRID}(N) = \sum_{i=1}^{m} C_{INTRA}(R_i) + C_{INTER}(m), \text{ where } N = \sum_{i=1}^{m} R_i.$$

There may be numerous topology combinations for a hybrid distributed computation graph. An example is a centralized binomial swap forest Monalytics graph that uses a centralized topology within each zone and a binomial swap forest topology inter-zone. Another example is a centralized-hierarchy-binomial swap forest Monalytics graph that has centralized or hierarchical topologies within zones and a binomial swap forest topology to connect the zones. Binomial swap forest—binomial swap forest Monalytics can be another example of a topology combination used for hybrid distributed computation graphs. In such a topology combination, a binomial swap forest topology is used both intra- and inter-zone. It is hybrid in the sense that the sizes of the intra-zone binomial swap forest and the inter-zone binomial swap forest topologies are different. Assuming all zones have the same size ($N_r$), the time to insight ($T_{CB}$) and capital cost ($C_{CB}$) for a centralized binomial swap forest hybrid distributed computation graph can be:

$$T_{CB}(N) = T_C(N_r) + T_{BSF}\left(\text{ceil}\left(\frac{N}{N_r}\right)\right) \text{ and } C_{CB}(N)$$

$$= \text{ceil}\left(\frac{N}{N_r}\right) * C_c(N_r) + C_{BSF}\left(\text{ceil}\left(\frac{N}{N_r}\right)\right).$$

At the model evaluation module 422, the topology constructor can use the specific system parameters 412 and system size (e.g., number of nodes N 410) provided to the topology constructor (e.g., by an administrator) to evaluate analytical models for various system topologies. The output of this evaluation is the actual performance (P), actual quality (Q), and actual cost (C) values 430 for those respective topologies. The topology constructor can narrow down the set of topologies to those that would have actual performance (P) and actual quality (Q) values that fit closest to the desired performance (P') values 414 and desired quality (Q') values 416 specified to the topology constructor in the fitting module 424. Among the narrowed down set of topologies 432, the topology constructor can choose, at the optimization module 426, the one that provides a decreased cost for a given number of nodes (N) in the network system infrastructure (e.g., optimizing (P*Q/C)), while also being stable if the number of nodes (N) changes. The topology constructor can then provide a final topology 420 that fits the monitoring and analysis system's needs.

During a fitting phase at the fitting module 424, if the known topologies 428 don't fit or match the desired performance (P') values 414 and desired quality (Q') values 416, the topology constructor can create analytical models impromptu for new topologies at 434 (e.g., a hybrid topology that combines centralized, hierarchical, and decentralized topologies within a zone and across zones). These models 434 can be provided to the model evaluation module 422, and the execution flow can be repeated with a new model. The hybrid monitoring system topology can include a monitoring system topology combining at least one of the monitoring system topologies across multiple locations of a data center or across a single location of a data center.

Figure 5:
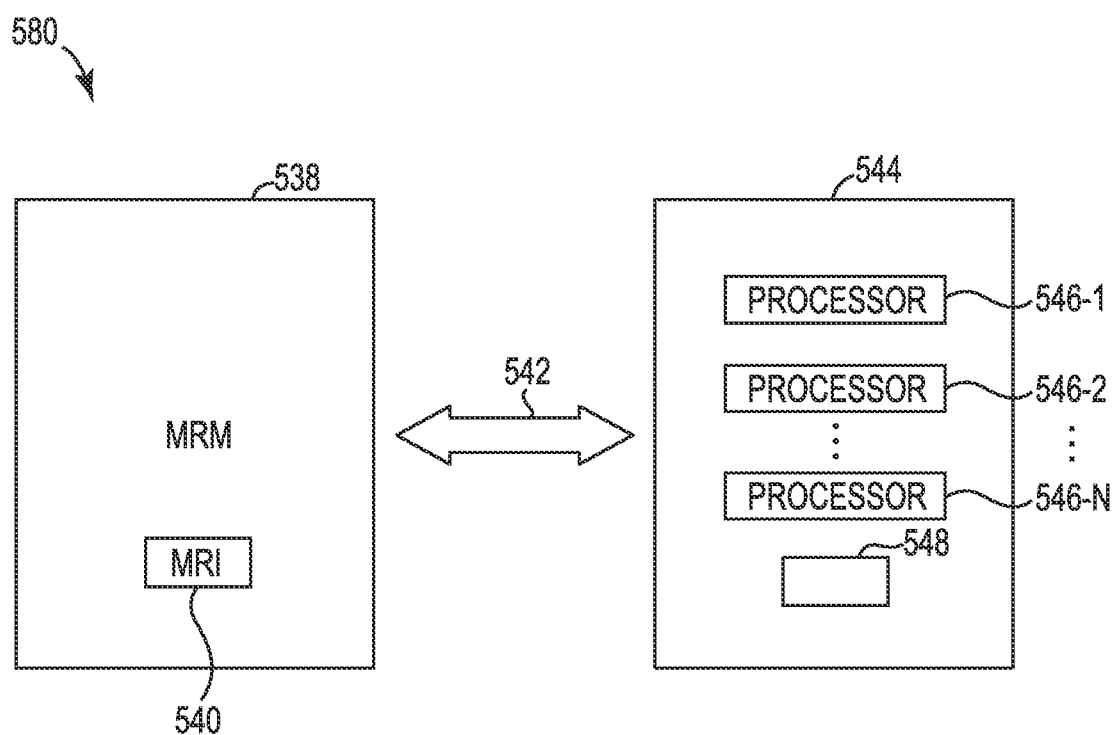
FIG. 5 illustrates a block diagram of an example of a machine-readable medium in communication with processing resources for network system management according to the present disclosure.

FIG. 5 illustrates a block diagram 580 of an example of a machine-readable medium (MRM) 538 in communication with processing resources 546-1, 546-2 ... 546-N for network system management according to the present disclosure. A machine-readable medium 538 can be in communication with a computing device 544 (e.g., Java application server, having processor resources of more or fewer than 546-1, 546-2 ... 6-N). The computing device 544 can be in communication with, and/or receive a tangible non-transitory MRM 538 storing a set of machine readable instructions 540 executable by one or more of the processor resources 546-1, 546-2 ... 546-N, as described herein. The computing device 544 may include memory resources 548, and the processor resources 546-1, 546-2 ... 546-N may be coupled to the memory resources 548.

Processor resources 546-1, 546-2 ... 546-N can execute machine-readable instructions 540 that are stored on an internal or external non-transitory MRM 538. A non-transitory MRM (e.g., MRM 538), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of machine-readable media.

The non-transitory MRM 538 can be integral, or communicatively coupled, to a computing device, in either in a wired or wireless manner. For example, the non-transitory machine-readable medium can be an internal memory, a portable memory, a portable disk, or a memory associated with another computing resource (e.g., enabling the machine-readable instructions to be transferred and/or executed across a network such as the Internet).

The MRM 538 can be in communication with the processor resources 546-1, 546-2 ... 546-N via a communication path 542. The communication path 542 can be local or remote to a machine associated with the processor resources 546-1, 546-2 ... 546-N. Examples of a local communication path 542 can include an electronic bus internal to a machine such as a computer where the MRM 538 is one of volatile, non-volatile, fixed, and/or removable storage medium in communication with the processor resources 546-1, 546-2 ... 546-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 542 can be such that the MRM 538 is remote from the processor resources e.g., 546-1, 546-2 ... 546-N such as in the example of a network connection between the MRM 538 and the processor resources e.g., 546-1, 546-2 ... 546-N. That is, the communication path 542 can be a network connection. Examples of such a network connection can include a local area network (LAN), a wide area network (WAN), a personal area network (PAN), and the Internet, among others. In such examples, the MRM 538 may be associated with a first computing device and the processor resources 546-1, 546-2 ... 546-N may be associated with a second computing device (e.g., a Java application server).

The processor resources 546-1, 546-2 ... 546-N coupled to the memory 548 can receive a network system size and a number of system parameters. The processor resources 546-1, 546-2 ... 546-N coupled to the memory 548 can also receive a number of monitoring system topologies, and evaluate the number of monitoring system topologies using the network system size and the number of system parameters. Furthermore, the processor resources 546-1, 546-2 ... 546-N coupled to the memory 548 can determine an actual monitoring system performance, an actual monitoring system quality, and an actual cost for each of the number of monitoring system topologies based on the evaluation.

The processor resources 546-1, 546-2 ... 546-N coupled to the memory 548 can also receive a desired monitoring system performance and a desired monitoring system quality, and compare the actual monitoring system performance and the actual monitoring system quality to the desired monitoring system performance and the desired monitoring system quality. Additionally, the processor resources 546-1, 546-2 ... 546-N coupled to the memory 548 can generate one of the number of monitoring system topologies for a monitoring and analysis system based on the comparison.

Figure 6:
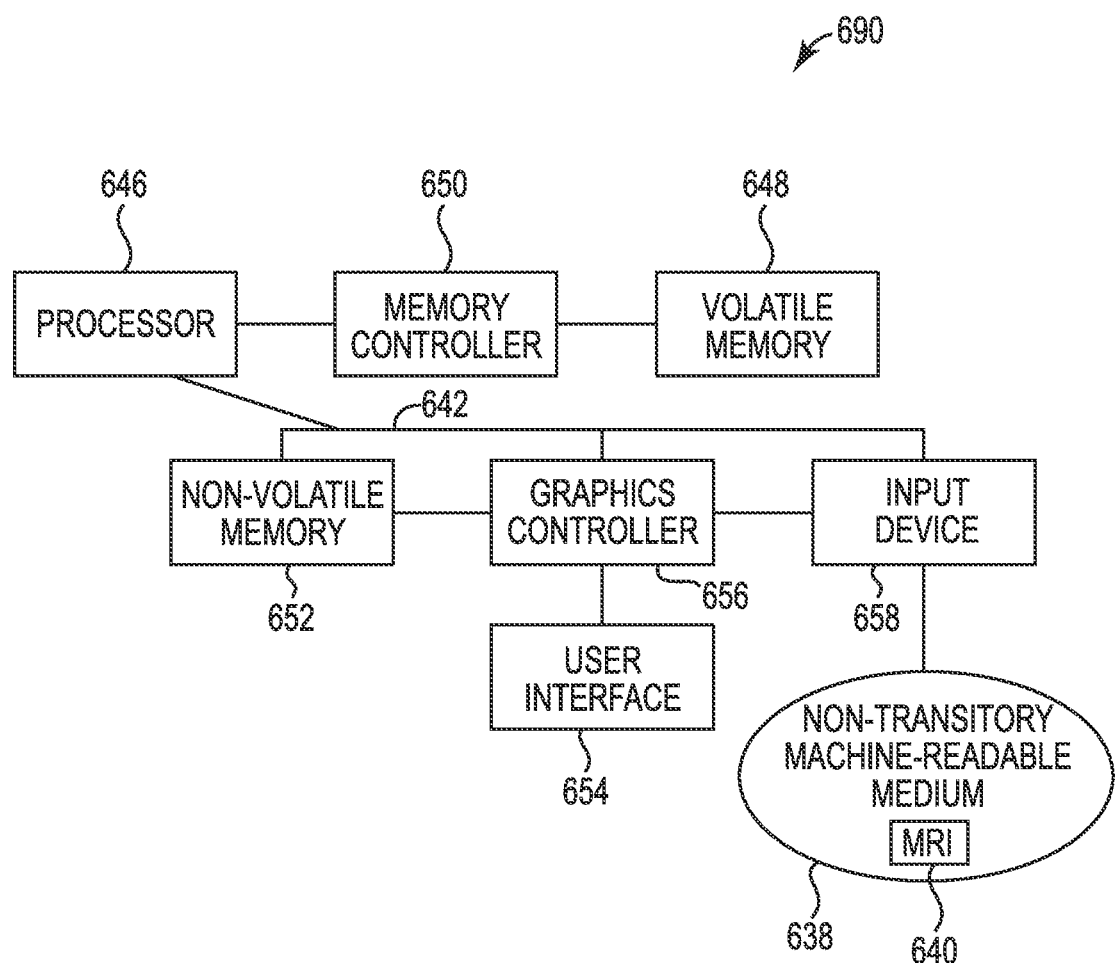
FIG. 6 illustrates a block diagram of an example of a computing system for network system management according to the present disclosure.

FIG. 6 illustrates a block diagram of an example of a computing system 690 for network system management according to the present disclosure. However, examples of the present disclosure are not limited to a particular computing system configuration. The system 690 can include processor resources 646 and memory resources (e.g., volatile memory 648 and/or non-volatile memory 652) for executing instructions stored in a tangible non-transitory medium (e.g., volatile memory 648, non-volatile memory 652, and/or MRM 638) and/or an application specific integrated circuit (ASIC) including logic configured to perform various examples of the present disclosure. A computer (e.g., a computing device) can include and/or receive a tangible non-transitory MRM 638 storing a set of machine-readable instructions 640 (e.g., software) via an input device 658. As used herein, processor resources 646 can include one or a plurality of processors such as in a parallel processing system. Memory resources can include memory addressable by the processor resources 646 for execution of machine-readable instructions. The MRM 638 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 652 can be a database including a plurality of physical non-volatile memory devices. In various examples, the database can be local to a particular system or remote (e.g., including a plurality of non-volatile memory devices 652).

The processor resources 646 can control the overall operation of the system 690. The processor resources 646 can be connected to a memory controller 650, which can read and/or write data from and/or to volatile memory 648. The memory controller 650 can include an ASIC and/or a processor with its own memory resources (e.g., volatile and/or non-volatile memory). The volatile memory 648 can include one or a plurality of memory modules (e.g., chips).

The processor resources 646 can be connected to a bus 642 to provide for communication between the processor resources 646 and other portions of the system 690. The non-volatile memory 652 can provide persistent data storage for the system 690. The graphics controller 656 can connect to a user interface 654, which can provide an image to a user based on activities performed by the system 690.

Each system can include a computing device including control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute machine-readable instructions (e.g., machine readable instructions 640) that are stored on a non-transitory MRM (e.g. non-transitory MRM 638). The non-transitory MRM can be integral, or communicatively coupled, to a computing device, in either in a wired or wireless manner. For example, the non-transitory MRM 638 can be an internal memory, a portable memory, a portable disk, or a memory located internal to another computing resource (e.g., enabling the machine-readable instructions to be downloaded over the Internet). The non-transitory MRM 638 can have machine-readable instructions 640 stored thereon that are executed by the control circuitry (e.g., processor) to provide a particular functionality.

The non-transitory MRM 638, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory machine-readable medium can include optical discs, digital versatile discs (DVD), Blu-Ray Discs, compact discs (CD), laser discs, and magnetic media such as tape drives, floppy discs, and hard drives, solid state media such as flash memory, EEPROM, phase change random access memory (PCRAM), as well as other types of machine-readable media.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A computer-implemented method for network system management comprising:
    receiving, at a monitoring system topology constructor, a network system size and a number of system parameters;
    receiving, at the monitoring system topology constructor, a desired monitoring system performance and a desired monitoring system quality; and
    generating, at the monitoring system topology constructor, a monitoring system topology for a monitoring and analysis system based on the network system size, the number of system parameters, the desired monitoring system performance, and the desired monitoring system quality,
        wherein the monitoring system topology has a cost that meets or exceeds a threshold based on an actual monitoring system performance, an actual monitoring system quality, and an actual cost of the monitoring and analysis system; and
        wherein the monitoring system topology is least sensitive to changes in the network system size to maintain the threshold.

2. The method of claim 1 wherein the number of system parameters includes at least one of a number of sensors per node, a network system latency, an available end-to-end bandwidth of the network system, a per-node data size, a per-node failure probability, a per-metric comparison time, a bandwidth budget of the network system for monitoring, and a number of nodes in a particular location of a data center.

3. The method of claim 1 wherein the network system size includes a number of nodes in an infrastructure of the network system.

4. The method of claim 1 wherein the desired monitoring system performance includes at least one of a desired time to insight and a desired number of continuous analytics operations to be delivered per second to the monitoring and analysis system.

5. The method of claim 1 wherein the desired monitoring system quality includes at least one of a desired ratio of available data used for an analysis operation in the presence of a failure, a desired ratio of available data used for an analysis operation in a mismatch of sampling rates during aggregation, and a desired false alarm rate.

6. The method of claim 1, wherein the threshold includes (P*Q)/C wherein P is the actual monitoring system performance, Q is the actual monitoring system quality, and C is the actual cost of the monitoring and analysis system.

7. The method of claim 1 further comprising:
    receiving, at the monitoring system topology constructor, a desired cost of the monitoring and analysis system; and
    generating, at the monitoring system topology constructor, the system topology for the monitoring and analysis system based on the desired cost.

8. A non-transitory machine-readable medium storing a set of instructions for network system management executable by a computer to cause the computer to:

receive a network system size and a number of system parameters;

receive a number of analytical models for each of a number of monitoring system topologies;

evaluate the number of analytical models using the network system size and the number of system parameters;

determine an actual monitoring performance, an actual monitoring quality, and an actual cost for each of the number of analytical models based on the evaluation;

receive a desired monitoring performance and a desired monitoring quality;

compare the actual monitoring performance and the actual monitoring quality to the desired monitoring performance and the desired monitoring quality;

in response to meeting a comparison threshold, select one of the number of analytical models for a monitoring and analysis system based on the comparison and generate a corresponding one of the number of monitoring system topologies, wherein the one of the number of monitoring system topologies has a cost that meets or exceeds a threshold based on the actual monitoring performance, the actual monitoring quality, and the actual cost; and wherein the one of the number of monitoring system topologies is least sensitive to changes in the network system size to maintain the threshold; and in response to not meeting the comparison threshold, dynamically create a hybrid analytical model for the monitoring and analysis system and generate a corresponding monitoring system topologies.

9. The medium of claim 8 wherein the one of the number of monitoring system topologies is generated at runtime.

10. The medium of claim 8 wherein the number of monitoring system topologies include at least one of centralized, hierarchical, decentralized and hybrid monitoring system topologies.

11. The medium of claim 10 wherein the hybrid monitoring system topologies include a combination of at least one of the number of monitoring system topologies, wherein the combination results in the desired monitoring system performance and the desired monitoring system quality within the threshold.

12. A computing system for network system management comprising:

a memory;

a processor resource coupled to the memory, to:

receive a network system size and a number of system parameters;

receive a number of analytical models for each of a number of monitoring system topologies;

evaluate the number of analytical models using the network system size and the number of system parameters;

receive a desired monitoring system performance and a desired monitoring system quality; and generate an analytical model of a hybrid monitoring system topology that results in the desired monitoring system performance and the desired monitoring system quality within a cost threshold in response to the evaluation, wherein the cost threshold includes a cost that meets or exceeds a threshold based on an actual monitoring system performance, an actual monitoring quality, and an actual cost of the monitoring system; and wherein the hybrid monitoring system topology is least sensitive to changes in the network system size to maintain the threshold.

13. The system of claim 12 wherein the hybrid monitoring system topology includes a monitoring system topology combining at least one of the number of monitoring system topologies within a particular location of a data center.

14. The system of claim 12 wherein the hybrid monitoring system topology includes a monitoring system topology combining at least one the number of monitoring system topologies across multiple locations of a data center.

* * * * *